US005490121A

United States Patent [19]
Gardner et al.

[11] Patent Number: 5,490,121
[45] Date of Patent: Feb. 6, 1996

[54] NONLINEAR EQUALIZER FOR MEASUREMENT WHILE DRILLING TELEMETRY SYSTEM

[75] Inventors: Wallace R. Gardner; G. A. Merchant, both of Houston, Tex.

[73] Assignee: Halliburton Company, Dallas, Tex.

[21] Appl. No.: 291,959

[22] Filed: Aug. 17, 1994

[51] Int. Cl.$^6$ .................................................. H04H 9/00
[52] U.S. Cl. ........................ 367/83; 340/853.1; 375/232
[58] Field of Search ........................ 340/853.1; 367/83, 367/84, 85; 375/14

[56] References Cited

U.S. PATENT DOCUMENTS

| | | | |
|---|---|---|---|
| 3,742,443 | 6/1973 | Foster et al. | 340/18 |
| 3,789,355 | 1/1974 | Patton | 340/18 |
| 4,276,943 | 7/1981 | Holmes | 175/40 |
| 4,291,395 | 9/1981 | Holmes | 367/83 |
| 4,323,991 | 4/1982 | Holmes et al. | 367/83 |
| 4,390,975 | 6/1983 | Shawhan | 367/82 |
| 4,391,299 | 7/1983 | Holmes | 137/831 |
| 4,399,877 | 8/1983 | Jackson et al. | 175/45 |
| 4,418,721 | 12/1983 | Holmes | 137/810 |
| 4,468,786 | 8/1984 | Davis | 375/11 |
| 4,590,593 | 5/1986 | Rodney | 367/83 |
| 4,615,038 | 9/1986 | Lim et al. | 375/14 |
| 4,642,800 | 2/1987 | Umeda | 367/85 |
| 4,692,911 | 9/1987 | Scherbatskoy | 367/83 |
| 4,730,281 | 3/1988 | Rodney et al. | 367/44 |
| 4,878,206 | 10/1989 | Grosso et al. | 367/83 |
| 5,010,333 | 4/1991 | Gardner et al. | 340/856 |
| 5,146,433 | 9/1992 | Kosmala et al. | 367/83 |
| 5,229,765 | 7/1993 | Gardner | 340/853.2 |
| 5,365,229 | 11/1994 | Gardner et al. | 340/855.4 |

OTHER PUBLICATIONS

K. Feher, "Digital Communications: Microwave Applications," Prentice Hall, Inc., 1981.
M. L. Honig et al., "Adaptive Filters: Structures, Algorithms, and Applications," Kluwer Academic Publishers, 1985, pp. 24–25, 35–63.

E. A. Lee et al., "Digital Communication," Kluwer Academic Publishers, 1988.
Astrom, K. T. et al., "On Self– Tuning Regulator," Automatica, vol. 9, 1973, pp. 195–199.
P. B. Brown et al., "A 60–Hz Harmonic Eliminator," IEEE Transactions on Biomedical Engineering, vol. BME–25, No. 4, Jul. 1978, pp. 392–397.
M. R. Sambur, "Adaptive Noise Cancelling for Speech Signals," IEEE Transactions on Acoustics, Speech and Signal Processing, vol. ASSP-26, No. 5, Oct. 1978, pp. 419–423.
J. Wang et al., "Adaptive Harmonic Noise Cancellation With An Application to Distribution Power Line Communications," IEEE Transactions on Communications, vol. 36, No. 7, Jul. 1988, pp. 875–884.
B. Widrow et al., "Adaptive Noise Cancelling: Principles and Applications," Proceddings of the IEEE, vol. 63, No. 12, Dec. 1975, pp. 484–491.
J. R. Glover, "Adaptive Noise Cancelling Applied to Sinusoidal Interferences," IEEE Transactions on Acoustics, Speech, and Processing, vol. ASSP-25, No. 6, Dec. 1977, pp. 484–491.
R, Desbrandes, et al., "MWD Transmission Data Rates Can be Optimized" Petroleum Engineer International, Jun. 1987, pp. 46–52.

*Primary Examiner*—J. Woodrow Eldred
*Attorney, Agent, or Firm*—Arnold White & Durkee

[57] ABSTRACT

A nonlinear equalizer aids in transmitting data with more speed and accuracy by reducing nonlinear signal distortion such as found in a mud transmission channel in an MWD telemetry system. The nonlinear equalizer receives an input signal that is modified by at least one nonlinear function element. The nonlinear equalizer also includes multiple linear equalizers: one such linear equalizer receives the unmodified input signal, and the other linear equalizers receive output signals from the nonlinear function elements. Output signals of the linear equalizers are summed to provide the nonlinear equalizer's output signal.

13 Claims, 6 Drawing Sheets

NONLINEAR EQUALIZER FOR MEASUREMENT WHILE DRILLING TELEMETRY SYSTEM

BACKGROUND OF THE INVENTION

1. Field of the Invention

The present invention relates generally to telemetry systems for measurement while drilling ("MWD") technology and more particularly relates to a nonlinear equalizer to reduce nonlinear signal distortion present in a transmission channel such as the mud column of an MWD telemetry system, thereby transmitting data with a relatively increased data rate and with improved accuracy.

2. Description of Related Art

The chief traditional method for obtaining information about subsurface formations surrounding an oil well is wireline logging. Generally, in wireline logging a sensitive measuring instrument is lowered down a wellbore, and measurements are made at different depths of the well. The measuring instrument may take various forms as required, for example, to perform electric logs, nuclear logs, or formation testing logs, etc. Electrical logs are typically used to locate hydrocarbon reserves. In contrast, nuclear logs are employed to determine the volume of hydrocarbons in the reserves, typically by determining the porosity of the materials in reserves identified by the electrical logs. In addition to electric and nuclear logs, formation pressure testing logs are often used to determine the moveability of the reserves, chiefly by determining the reserves' pressure and permeability.

One disadvantage of wireline logging is that its procedures are time consuming. For instance, wireline logging cannot be started until the well is drilled and the drilling equipment is completely removed from the well. To overcome this limitation, geophysicists have been researching and developing techniques such as "measurement while drilling" and "logging while drilling" techniques. With logging while drilling, downhole logging tools are used to transmit logging data such as gamma ray and resistivity measurements upward through the mud column while the drilling string is deployed downhole. With measurement while drilling, data concerning different aspects of the drilling process is measured and transmitted to the surface while the drilling string is downhole. Such data, for example, may involve directional drilling data, mud flow data. These technologies are often generically referred to as "MWD" operations.

In MWD operations, measurements are made downhole while drilling, and representative data signals are transmitted uphole through the drilling mud ("mud column") in the well. A subassembly, often positioned in the drilling string near the drill bit, may be used to carry the measuring equipment. Data is often transmitted to the surface during pauses between drilling activity, such as when additional sections of pipe are being added to the string.

In an exemplary MWD arrangement (FIG. 1), a drill string 100 is present in a wellbore 102. As the bit 104 drills deeper and deeper into the earth, more and more of the drill string 100 is lowered into the created wellbore 102. To aid in cooling the bit 104 and to assist in removing cuttings generated by the bit 104, the wellbore 102 is filled with drilling mud 106, which is circulated by a mud pump 108. The mud pump 108 injects drilling mud downward through a hollow, central conduit 110 interior to the drilling string. The mud eventually advances through passages (not shown) in the bit 104, travels upward in an annulus 112 between the drill string 100 and the wellbore 102, and returns to the mud pump 108. Mud returning to the pump 108 may be processed to remove cuttings and other undesirable materials.

Figure 1:
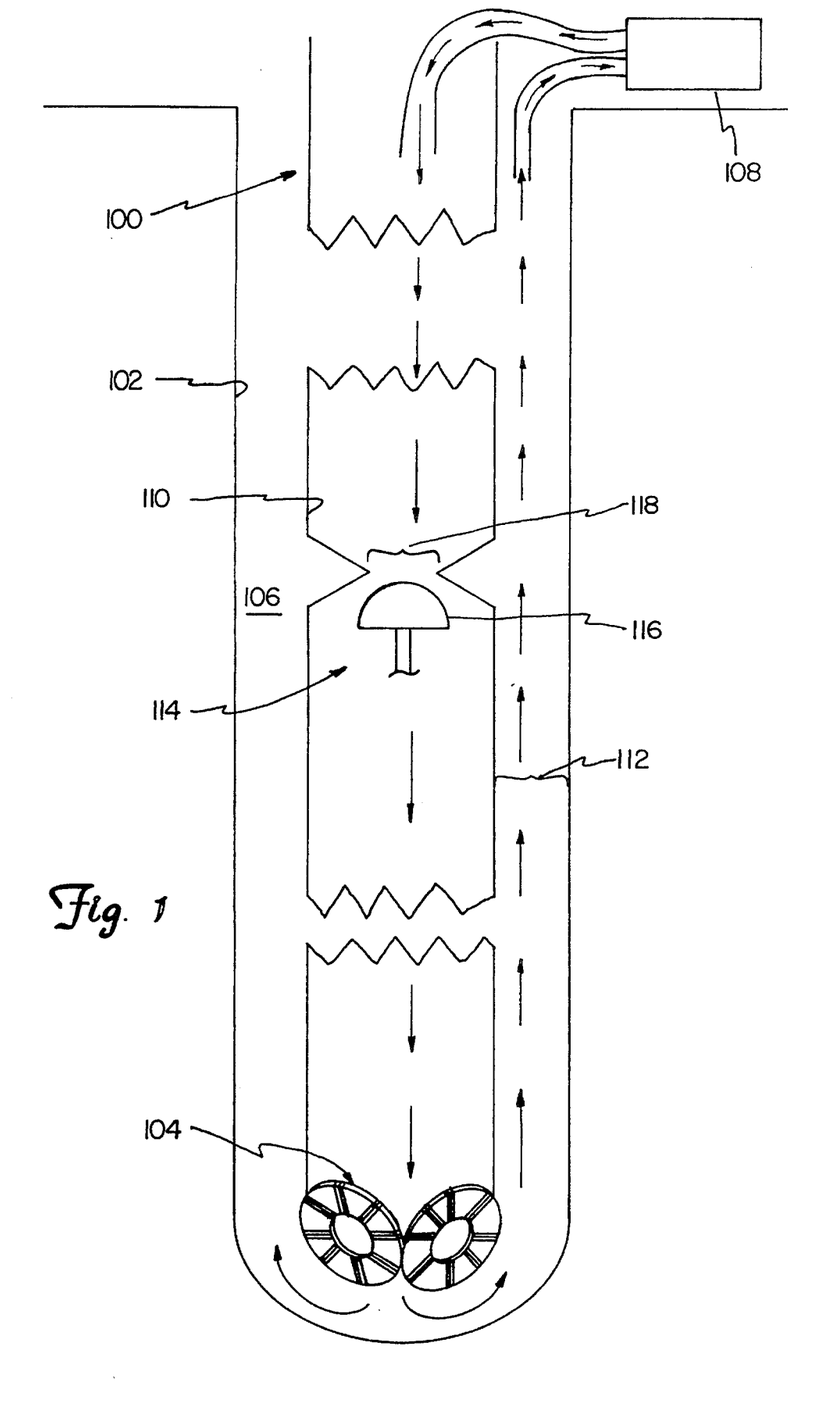
FIG. 1 is a diagram of an exemplary MWD system.

Downhole characteristics of the mud flow, formation, temperature, and the like are analyzed by one or more measurement tools (not shown), which translate these measurements into digital signals. For instance, binary signals (i.e., logic 1 and logic 0 values) may be used. Then, a mud pulser 114 receives the digital signals, and selectively interrupts the flow of mud through the conduit 110 (i.e., "pulses") in response to the digital signals.

In the illustrated embodiment, the mud pulser 114 includes a poppet valve, which includes a rounded piston 116 and a mud valve 118 that comprises a narrowed aperture sized to sealingly receive the piston 116. Hence, by reciprocating upward and downward, the piston 116 is able to selectively restrict the flow of mud through the mud valve 118. At the surface, a pressure transducer (not shown) is used to detect and measure pressure wave fluctuations created in the mud column by the mud pulser 114, to assist in decoding the signals transmitted by the mud pulser 114.

Another embodiment of mud pulser is the "mud siren", which continuously phase modulates a sinusoidal wave generated by a rotary valve. The phase modulation is achieved by changing the speed of the motor rotating the valve.

Conventional MWD systems provide data with a reliability level, and at a data rate, that are insufficient for some users or for some applications. These limitations can become particularly problematic as MWD technology is relied upon to handle increasing quantities and varieties of downhole data.

Some of MWD's technical limitations result from the data signal (the "mud pulse waveform") being distorted by the mud column during transmission to the surface. Many MWD telemetry systems operate at 1–2 bits per second, and employ simple binary mud-pulse waveforms. However, the telemetry receivers of these systems typically fail to correct for distortion introduced by the mud column.

Some systems, in attempts to increase the accuracy and rate of data transmission of MWD telemetry systems, have utilized relatively complex telemetry waveforms and receiver techniques from other telemetry system technologies. For example, MWD telemetry receivers have been proposed which employ an adaptive linear channel equalizer such as a transversal filter equalizer ("TFE") or a decision feedback equalizer ("DFE") to compensate for signal distortion caused by the mud transmission channel.

Although these linear equalizers are helpful in some situations, in many applications they can fail to adequately correct channel distortion when complex data signals are used, since MWD systems inherently include a number of nonlinear characteristics. In this context, the "nonlinearity" relates, for example, to the effects that pulsing of the mud transmission channel at a single frequency may provide a multi-frequency output at the surface, and that the frequency of the output signal may vary depending upon the amplitude of the input signal.

One factor that contributes to the nonlinearities of MWD systems is the nonlinearity of the mud pulse transmitter. For example, the mud pulse transmitter's ability to output the desired mud pressure signal shape may be degraded due to limitations in the fluid velocity rate. Also, it may be mechanically difficult for the mud pulser 114 to overcome the significant downward pressure exerted by the mud column. Another factor contributing to MWD systems' nonlinearities is the nonlinearity of mud columns themselves, due to their non-homogeneous fluid characteristics. Also, signals produced by mud pulsers are nonlinear: signals are produced by changes in pressure created by the piston 116, which is a function of the area of the conduit 110 and the distance that the piston 116 reciprocates. Also, the characteristics of the mud pulser 114 itself may change over time in a nonlinear fashion, due to wear.

Therefore, because most MWD telemetry receivers do not adequately compensate for nonlinearities in the mud column, many MWD telemetry systems are unable to employ more complex signal modulation techniques, and hence may not have a sufficiently high reliability and data transmission rate to optimally satisfy telemetry demands.

SUMMARY OF INVENTION

The present invention, in one broad aspect, concerns a nonlinear equalizer for use with telemetry systems having a nonlinear transmission medium, such as a drilling mud column. The nonlinear equalizer receives an input signal, which is modified by at least one nonlinear function element. The nonlinear function elements may comprise, for example, circuit elements that perform functions such as limiting, rectifying, squaring, cubing, or other nonlinear functions.

The nonlinear equalizer also includes multiple linear equalizers: one such linear equalizer receives the unmodified input signal, and the other linear equalizers receive output signals from the nonlinear function elements. In an illustrative embodiment, each linear equalizer may comprise a transversal filter equalizer ("TFE") or a decision feedback equalizer ("DFE"). Output signals of the linear equalizers are summed to provide the nonlinear equalizer's output signal. The summed output signals will be processed by a coefficient adjustment unit to generate an adaptive signal communicated to each linear equalizer. In a preferred implementation, the summed output signal will be communicated to a slicer to assign digital values to the signal. The slicer output and the summed output signal will be coupled to a subtractive error unit to generate an error signal. This error signal is then utilized, in this preferred implementation, to implement a stochastic gradient algorithm to update the filter coefficient of each linear equalizer.

The present invention provides its users with a number of advantages. For instance, the invention effectively reduces signal distortion produced by a nonlinear transmission channels such as mud transmission channels in MWD telemetry systems. The invention may be advantageously used with an MWD telemetry system employing complex transmitted signals to communicate data at increased accuracy and transmission rate.

BRIEF DESCRIPTION OF DRAWINGS

The nature, objects, and advantages of the invention will become more apparent to those skilled in the art after considering the following detailed description in connection with the accompanying drawings, in which like reference numerals designate like parts throughout, wherein.

DESCRIPTION OF A PREFERRED EMBODIMENT

An exemplary embodiment of the invention (FIG. 2) may be implemented using a telemetry system 200 that includes a host computer and surface receiver operationally coupled to downhole sensor systems via a mud transmission channel residing in a drill string. More specifically, telemetry system 200 includes downhole sensors 202 for measuring different properties of downhole systems or formations. The sensors 202 may comprise, for example, devices that provide electrical signals representative of directional drilling data or mud flow data. Alternatively, sensors 202 may include devices for taking other measurements such as, for example, gamma ray, induction, resistivity, or density measurements. For instance, the information provided by the sensors 202 is electrically fed to a downhole data collector and multiplexer 204.

Figure 2:
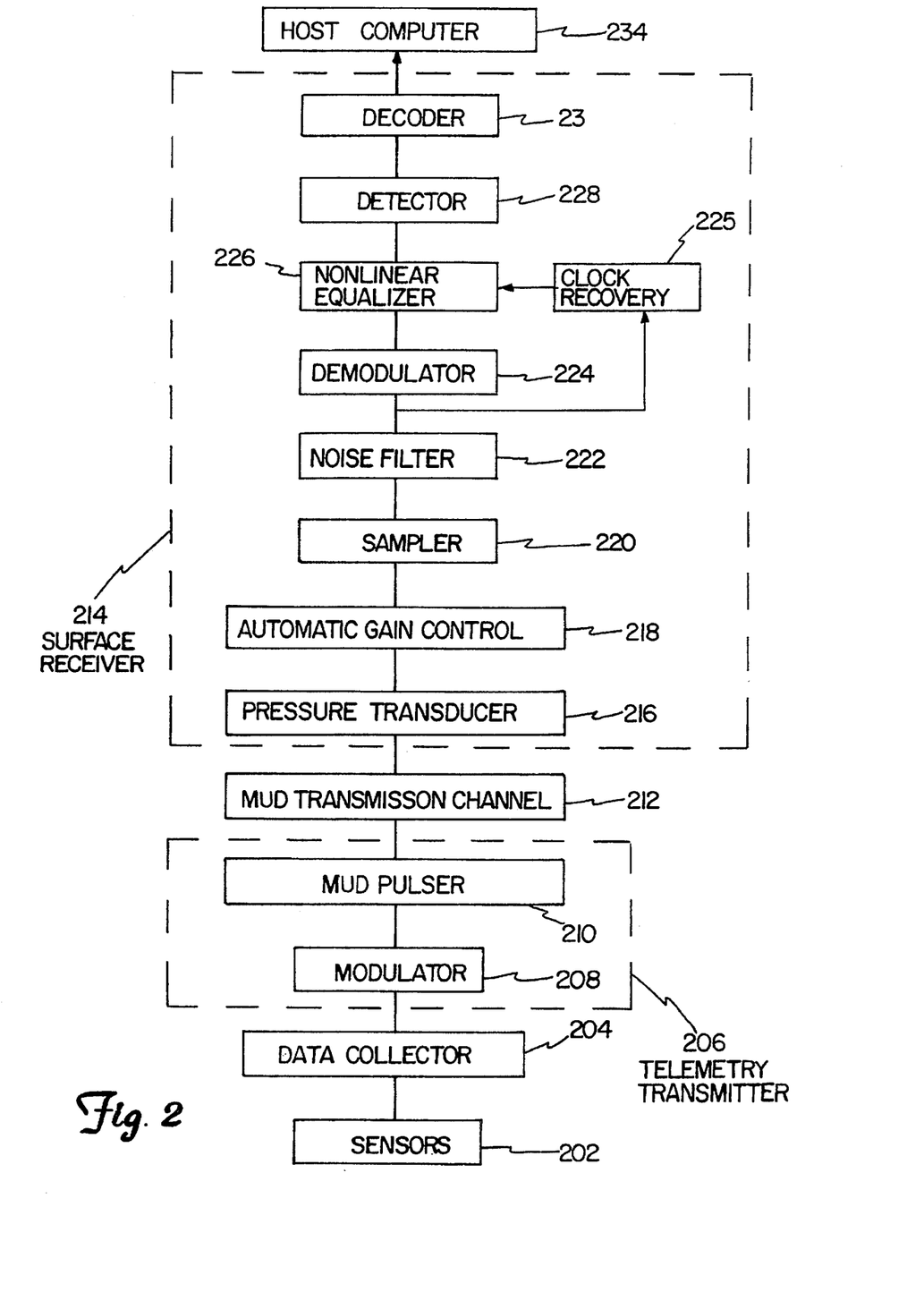
FIG. 2 is a block diagram illustrating the hardware components and interconnections of an exemplary MWD system 200 in accordance with the present invention.

Data collector and multiplexer 204 directs the assembled information, preferably in digital form, to a downhole telemetry transmitter 206, which converts the information to mud pulses in a mud transmission channel 212 that flows in the interior of a drill string. Telemetry transmitter 206 includes a modulator 208 and a mud pulser 210. The modulator 208 modulates data signals from the data collector 204 with a carrier signal to provide a modulated data signal. The modulation could be of any number of types such as quadrature amplitude modulation (QAM), which are well-known in digital communications textbooks. If a multi-level signal is used as described below, the modulator 208 may also be preceded by an encoder which encodes the data in a format compatible with the modulator, also as is well-known in digital communications textbooks. The mud pulser 210 then creates disturbances in the mud transmission channel 212 in response to the signals provided by the modulator 208. The mud pulser 210, for example, may comprise a poppet valve, mud siren, or other conventionally known type of pulsing device. An exemplary mud pulser suitable for use with the present invention is disclosed in U.S. patent application No. 08/037,757, entitled "Measurement-While-Drilling Telemetry Apparatus and Method," filed Mar. 26, 1993 in the names of W. Gardner & G. Gilbert. The disclosure of U.S. application No. 08/037,757 is hereby incorporated herein by reference.

The mud pulser 210 may employ a positive pulsing scheme or a negative pulsing scheme. With a positive pulsing scheme, the mud pulser 210 restricts the flow of mud through the drilling string; whereas, with a negative pulsing scheme, the mud pulser 210 diverts the flow of mud through the string to the well annulus.

In a preferred embodiment, the mud pulser 210 generates a pressure waveform that includes multiple data elements called "symbols", where each symbol may comprise various pressure levels. For example, with a 3-level signal, each symbol may comprise a high level signal, a medium signal, or no signal. Such a signal may be represented digitally by a sequence of 0's, 1's, and 2's. Other multi-level signals are contemplated as well, such as 5 or 7-level signals or quadrature combinations of multi-level signals (QAM) as is well-known to those versed in digital communication theory.

Disturbance pressure waveforms generated by the mud pulser 210 are transmitted upward through the mud transmission channel 212, and are subsequently received near the surface by a surface receiver 214. The surface receiver 214 includes a number of sub-components, including a pressure transducer 216 that actually receives the pressure waveforms in the mud transmission channel 212 and generates an electrical signal representative of the received telemetry signal. The transducer 216 is preferably a static pressure transducer, as is known to the art.

The transducer signal is processed by an automatic gain control ("AGC") circuit 218. The automatic gain control 218 amplifies analog data signals produced by the transducer 216 to effectively keep the signal voltage level constant, except for the modulation. Signals from the automatic gain control 218 are fed to a sampler 220, which converts the analog signals of the automatic gain control 218 to digital signals. The sampler 220, in an illustrative embodiment, may comprise a 10 bit A-to-D converter.

Next, a noise filter 222 removes certain types of noise present in the digital signals supplied by the sampler 220. If the modulator 208 employs baseband modulation, the noise filter 222 preferably comprises a lowpass filter; likewise, if the modulator 208 employs passband modulation, the noise filter 222 preferably comprises a passband filter.

Signals from the noise filter 222 are directed to a demodulator 224, which removes the carrier previously introduced by the modulator 208, to yield signals corresponding to the data signals originally supplied by the collector 204. Signals from the noise filter 222 are also fed to a clock recovery circuit 225, which provides timing signals to a nonlinear equalizer 226.

The nonlinear equalizer 226 operates to effectively remove any nonlinear distortion introduced to the data signals from downhole. The operation and sub-components of the nonlinear equalizer 226 are described in greater detail below. However, it is understood that the nonlinear equalizer 226, in an illustrative embodiment, may be implemented using a circuit such as an Analog Devices model ADSP2101 digital signal processing integrated circuit.

Signals from the nonlinear equalizer 226 are directed to a detector, which operates to determine what data value the equalized data symbol represents. The detected data is then decoded 232 in an inverse manner to the downhole data coding. Finally, the decoded signals are delivered to a host computer 234, which analyzes, interprets, and otherwise processes the signals to reproduce the measurements made by sensors 202. The computer 234 may be selected from any number of appropriately programmed digital computers of sufficient computing power for the selected operation, such as IBM computers, Digital Equipment Corporation computers, or Unix workstations.

1. Nonlinear Equalizer and Detector

Figure 3:
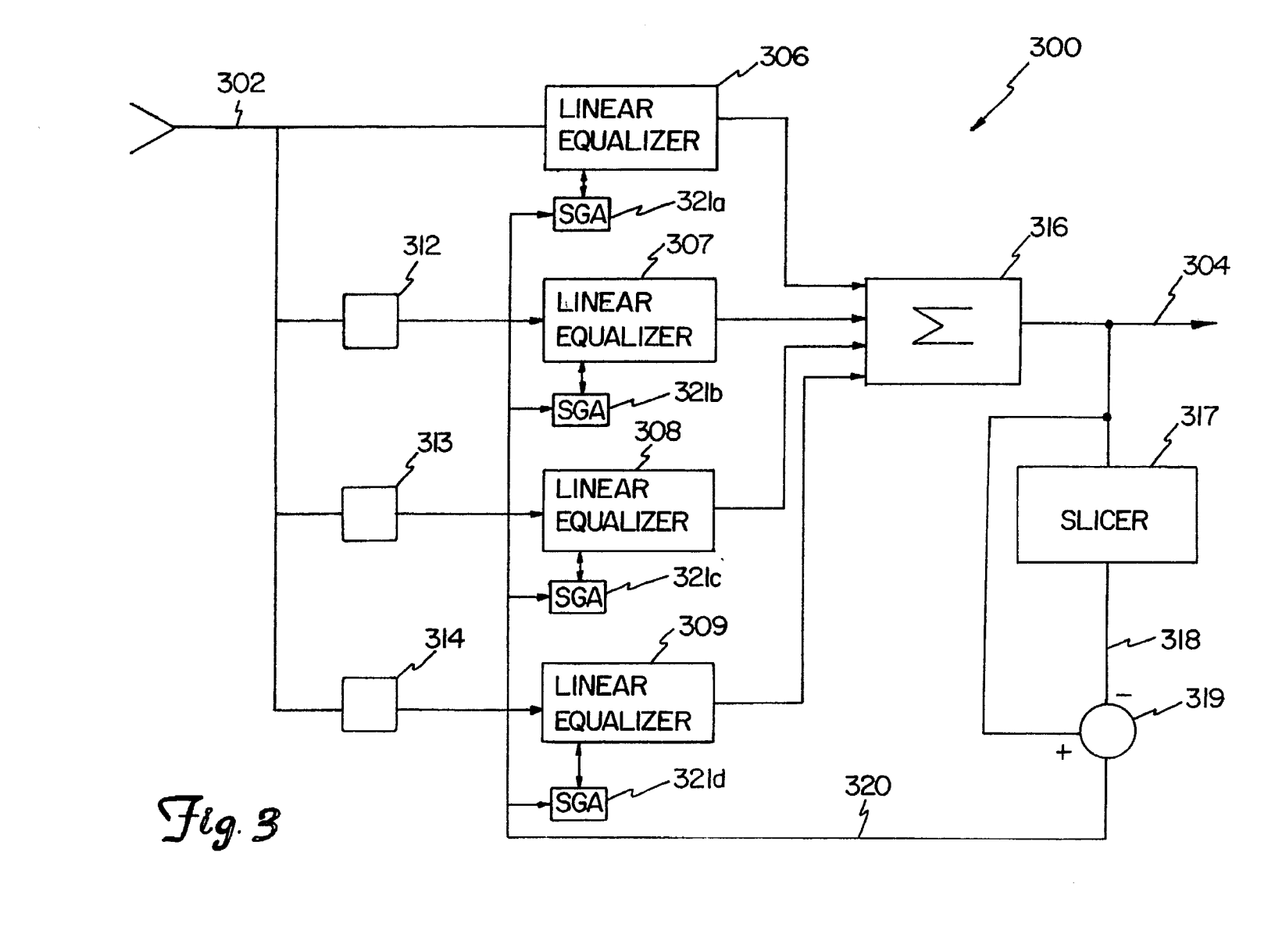
FIG. 3 is a block diagram illustrating the hardware components and interconnections of an exemplary nonlinear equalizer 300 in accordance with the present invention.

The nonlinear equalizer 226 of the invention may be implemented in the form of a nonlinear equalizer 300 as formed by the components schematically depicted in FIG. 3.

The nonlinear equalizer 300 receives an input signal from an input line 302, and provides an equalized output signal on a line 304. (For convenience, the input signal and output signal may also be referenced by the numerals 302, 304.) The nonlinear equalizer 300 includes multiple linear equalizers, which in an illustrative embodiment may comprise four linear equalizers 306–309. As discussed in greater detail below, each linear equalizer 306–309 preferably comprises a transverse filter equalizer CTFE") or a decision feedback equalizer ("DFE"). DFEs will usually be used, even though they are more complex than the TFEs, because of their ability to reduce the effects of noise.

Linear equalizer 306 receives an input signal from the input line 302. However, linear equalizers 307–309 each receive their inputs from a respective nonlinear function circuit 312–314, each of which receives a common input signal from the input line 302. Each nonlinear function circuit 312–314 functions to generate a signal that is a nonlinear function of the input signal 302. For example, each circuit 312–314 may perform a nonlinear function such as limiting, rectifying, squaring, cubing, and the like. Preferably, each nonlinear function circuit 312-314 performs a different nonlinear function than the other circuits.

The signal output of each nonlinear function circuit 312–314 is processed by a respective linear equalizer 307–309 to provide output signals. Output signals of the linear equalizers 307–309, as well as the linear equalizer 306, are summed by a summation unit 316 to yield the output signal on output line 304. The digital output signal 304 is communicated to both a slicer 317 and to an error unit 319.

Slicer 317 associates each of the digital signals with a discrete signal level. In a 3-level system with digital signals between +1700 and −1700, for example, when the slicer 317 receives a digital signal having a value of greater than +567, the slicer may be programmed to interpret such signals as level +1. Similarly, the slicer 317 may interpret digital signals with a value between +567 and −567 as a level 0. Likewise, the slicer 317 may be programmed to interpret signals less than −567 as a level-1. The output 318 of slicer 317 is electrically connected to error unit 319. Error unit 319 generates an error signal at error output 320 by subtracting the slicer output signal 318 from the summation unit output signal 304. Error unit 319 directs the error signal to circuitry implement the stochastic gradient algorithm (SGA) 321 (see equation 1, herein) and to adjust the coefficients of each TFE linear equalizer 306–309. The adjusted coefficients are then updated in each linear equalizer 306–309. The stochastic gradient algorithm is well-known to those skill-in-the-art.

2. Structure of Transversal Filter Equalizer

Figure 4:
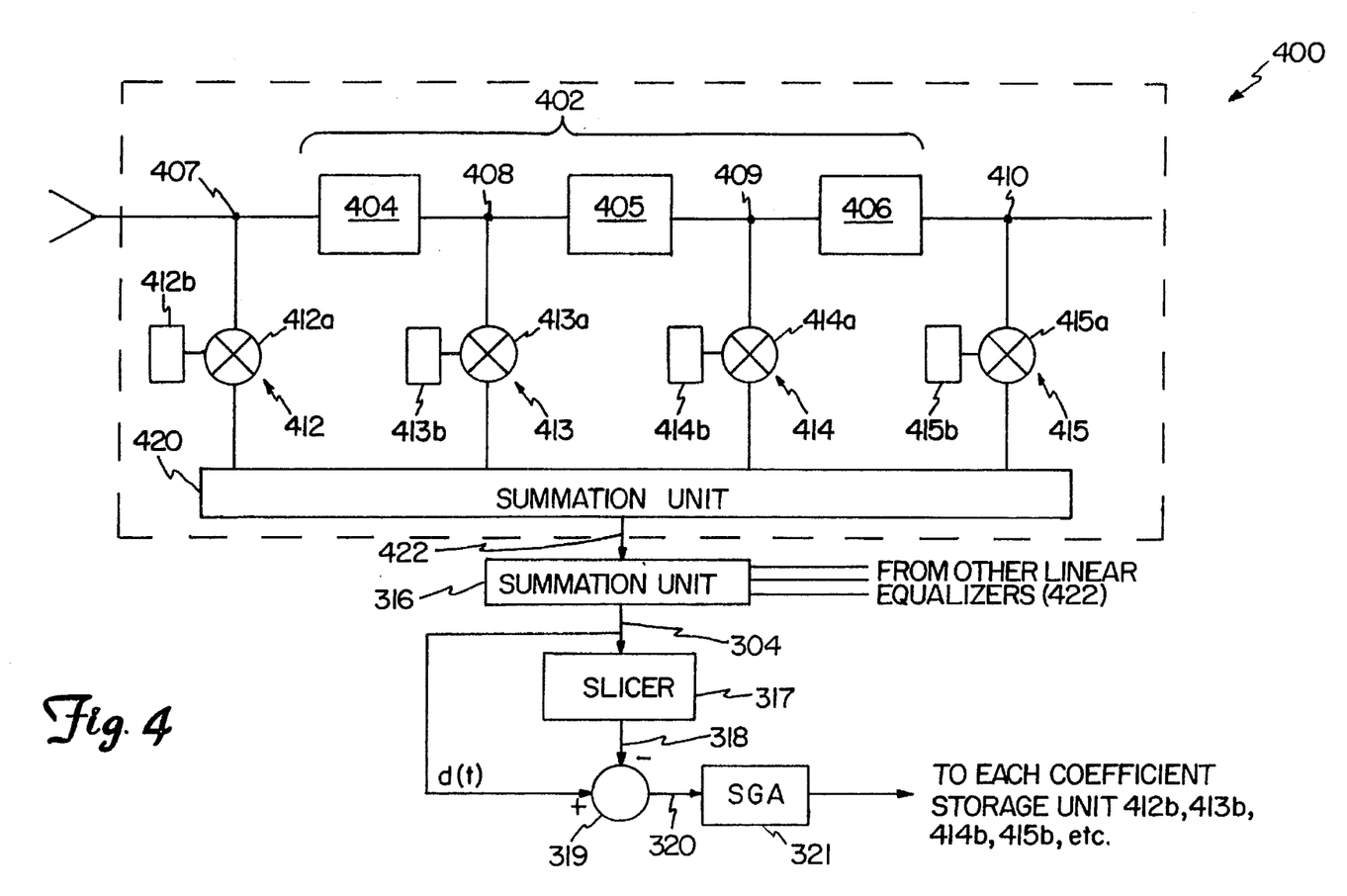
FIG. 4 is a block diagram illustrating the hardware components and interconnections of an exemplary transverse filter equalizer 400 of the nonlinear equalizer of FIG. 3, in accordance with the system of FIG. 2.

Having described the nonlinear equalizer 300, a more detailed explanation of the linear equalizers 306–309 will be made with reference to FIG. 4. In an illustrative embodiment, each of the linear equalizers 306–309 may comprise a separate transversal filter equalizer CTFE") 400. The TFE 400 will include a finite impulse response ("FIR") filter-equalizer.

In an exemplary embodiment, the TFE 400 includes a shift register buffer 402 that receives an input signal from an input tap line 407, and sequentially advances the input signal through a plurality of delay stages 404–406, corresponding to three additional tap lines 408–410. In the illustrated embodiment, three tap lines 408–410 are shown as an example, for ease of explanation. Only three taps are shown in the depicted illustrative embodiment. Another number of taps may be used, however; the number of taps may be selected based upon the length of time that the transmission impulse response takes to settle. A typical number of taps might be 16–32.

The tap lines 407–410 correspond to taps 412–415, respectively. The taps 412–415 each includes respective multiplier 412a–415a. Each multiplier 412a–415a multiplies the signal present on its respective tap line 407–410 by a coefficient signal provided by a corresponding coefficient storage unit 412b–415b. The coefficient signals are updated in response to the error signal 320, as discussed above. Signals from the multipliers 412a–415a are summed by an equalizer summation unit 420. The outputs 422 of each TFE are then communicated to summation unit 316 as discussed in reference to FIG. 3.

3. Operation of Transversal Filter Equalizer

Figure 5:
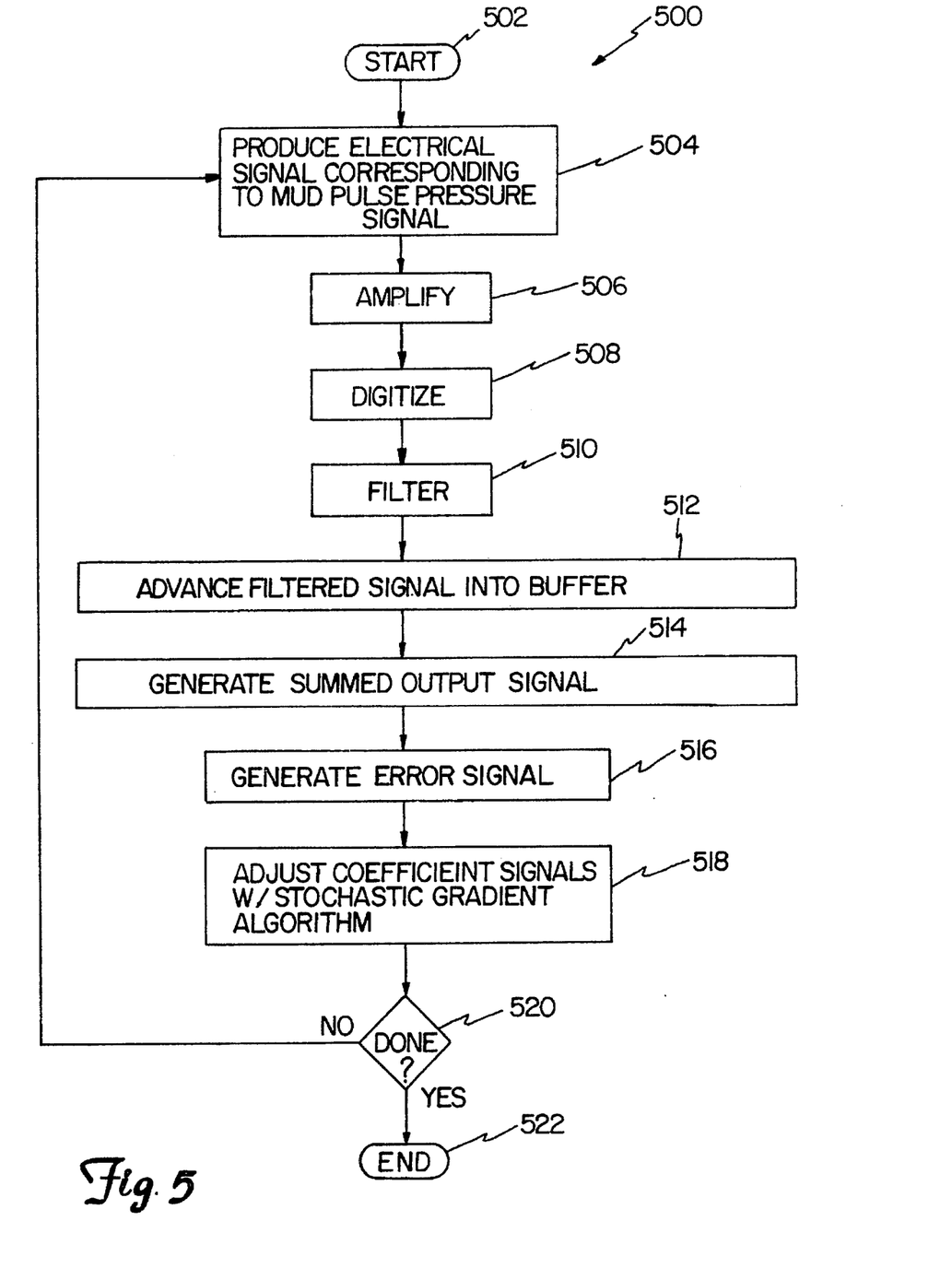
FIG. 5 is a flowchart depicting exemplary steps for operating an MWD telemetry system 200 in accordance with the present invention, where the transverse filter equalizer 400 of FIG. 4 is employed.

In reference to FIGS. 2–5, in accordance with an embodiment of the invention that employs the TFE 400, the MWD system 200 of the invention may be operated pursuant to a number of tasks 500 (FIG. 5). In an illustrative embodiment, operation of the TFE 400 may be initiated 502 when power is first applied to the surface receiver 213. Next, the transducer 216 receives a single symbol of the mud pulse waveform sent by the transmitter 206 and generates 504 an electrical signal corresponding to the received mud pulse pressure signal or waveform. The AGC 218 then amplifies the signal 506 as needed, to provide a signal of a specified amplitude. The sampler 220 then digitizes 508 the received symbol, and the noise filter 222 filters 510 the digitized symbol.

The filtered signal is then directed 512 to the nonlinear equalizer 226, where it is advanced onto the buffer 402 by shifting it onto the input tap line 407. Eventually, after a sufficient number of symbols are processed and advanced into the buffer 402, four symbols will be sequentially advanced onto all four lines 407–410, filling the buffer 402 with signals.

The TFE 400 then generates 514 a summed output signal on the summation output line 304, based upon the summed output 420 of all TFE's. To generate the error signal 320, the summed output signal 304 is communicated both to a slicer 318 and to an error unit 319. The slicer operates, in accordance with known techniques, to generate an output 318 of discrete signal levels. It should be recognized that the coefficient signals may be initialized in accordance with known techniques, such as blind equalization. Thus, when task 514 is performed for the first time, the signal on each equalizer summation output line 420 will not be zero.

Next, the error signal is computed 516, by subtracting the slicer output signal (318) from the accumulator output signal (304). Then, the coefficient signals stored in the coefficient storage units 412b–415b are adjusted 518 according to a relationship such as Equation 1 (also known on the stochastic gradient algorithm):

$$C_{x-new} = C_{x-old} - (\beta * ERR * DV_x) \quad (1)$$

where:

$c_{x-new}$=the new coefficient for the xth tap;

$C_{x-old}$=the old coefficient for the xth tap;

$\beta$=a sensitivity constant, explained below;

ERR=the error signal present at the error output 320a; and $DV_x$=the digitized signal that is present at the xth tap.

The sensitivity constant "$\beta$" adjusts the rate at which the coefficient signals are changed. In particular, a larger value of $\beta$ will cause the coefficient signals to adapt more quickly. However, when $\beta$ is too large, the coefficient signals may change too quickly, resulting in instability. With smaller values of $\beta$, the coefficient signals will adapt more slowly. However, when $\beta$ is too small, the coefficient signals may change too slowly, or not at all.

Generally, $\beta$ depends upon the amount of expected noise, and may be selected in practice using trial and error. In downhole well logging applications, it has been observed that a useful range for $\beta$ is between 0.005 and 0.01. Therefore, an illustrative value of $\beta$ would be 0.008.

After the coefficient signals are adjusted 518, query 520 either ends the routine 500 in task 522, or continues operation of the system 200 by returning control to the task 504.

4. Decision Feedback Equalizer

Figure 6:
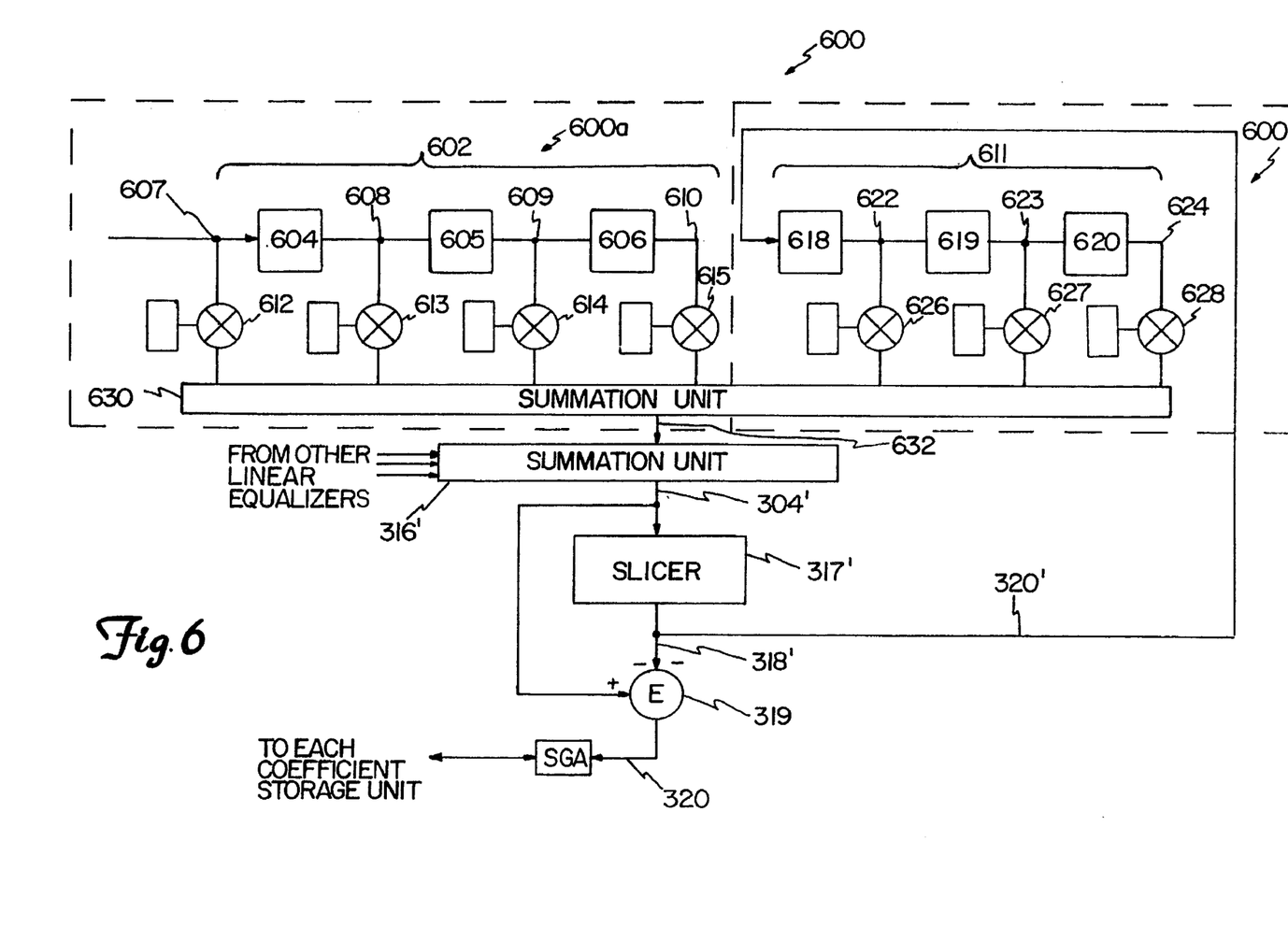
FIG. 6 is a block diagram illustrating the hardware components and interconnections of an exemplary decision feedback equalizer 600, suitable for use with the present invention.

Referring now to FIG. 6, in an alternative embodiment, the nonlinear equalizer 226 may employ another type of linear equalizer, such as a DFE, instead of a TFE 400. An exemplary DFE 600 is shown in FIG. 6. The DFE 600, like the TFE, may comprise a FIR filter. DFE includes what may be considered a forward equalizer 600a and a feedback equalizer 600b. Forward equalizer 600a includes a first shift register buffer 602 that receives an input signal from an input tap line 607, and sequentially advances the input signal through three delay stages 604–606, corresponding to three additional tap lines 608–610. As with the TFE 400, the number of taps 608–610 is only shown as an example, for ease of explanation. The tap lines 607–610 correspond to taps 612–615, respectively, each of which includes a multiplier and a coefficient storage unit.

The DFE 600 differs significantly from the TFE 400, however, since it includes feedback equalizer 600b. Feedback equalizer 600b includes an additional shift register buffer 611, with a plurality of delay stages 618–620, and additional tap lines 622–624 that correspond to additional taps 626–628. Buffer 611 (and therefore delay stages 618–620) does not receive input signals from input tap line 607, but rather from slicer output 318. As with the embodiment of FIG. 4, output signals from the taps 612–615 and 626–628 are summed by a summation unit 630, having an output line 632 that leads to summation unit 316. The summed equalizer outputs 304' are then processed, and the error signal is then generated, and the coefficients updated, substantially in the manner discussed relative to the preceding embodiment.

While there have been shown what are presently considered to be preferred embodiments of the invention, it will be apparent to those skilled in the art that various changes and modifications can be made herein without departing from the scope of the invention as defined by the appended claims.

What is claimed is:

1. A nonlinear equalizer for reducing distortion in an input signal, comprising:

a first number of nonlinear function elements, each element receiving a common input signal and providing an output signal, wherein the first number is at least one;

multiple linear equalizers each providing an output signal and being one more in number than said first number of nonlinear function elements, one of said linear equalizers receiving the common input signal and all remaining equalizers receiving an output signal from a different one of the nonlinear function elements; and a summation unit receiving the output signals of said linear equalizer to provide an equalized output signal by summing the output signals of the linear equalizers.

2. The nonlinear equalizer of claim 1, wherein said first number of nonlinear function elements is one.

3. The nonlinear equalizer of claim 1, wherein said linear equalizers comprise transversal filter equalizers.

4. The nonlinear equalizer of claim 1, wherein said linear equalizers comprise decision feedback equalizers.

5. A nonlinear equalizer for reducing noise in an input measurement while drilling dam signal, comprising:

a plurality of nonlinear function elements, each nonlinear function element operatively coupled to a common input, and each nonlinear function element providing an independent output;

a plurality of linear equalizers, said linear equalizers individually coupled to a selected one of said independent outputs of said nonlinear function elements and said common input signal, each said linear equalizer generating a linear equalizer output signal;

a summation unit operatively coupled to receive the linear equalizer output signal from each of said linear equalizers and to sum said signals to generate a summation output signal;

a slicer operatively coupled to receive said summation output signal and to assign digital values to portions of said digital summation output signal to generate a slicer output signal; and an error unit operatively coupled to receive said slicer output signal and said summation output signal and to determine an error signal in response thereto.

6. The nonlinear equalizer of claim 5, further comprising circuitry for implementing a stochastic gradient algorithm to generate an updated coefficient in response to said error signal, wherein said updated coefficient is communicated to each said linear equalizer.

7. The nonlinear equalizer of claim 5, wherein each said linear equalizer comprises a first plurality of taps, with said plurality of taps operatively separated by a plurality of delay stages, wherein at least one of said taps directly receives said data input signal.

8. The nonlinear equalizer of claim 7, wherein each said linear equalizer comprises a second plurality of taps, said taps operatively coupled to a plurality of delay stages, and wherein at least one of said taps receives an input signal from said slicer.

9. The nonlinear equalizer of claim 7, wherein each said equalizer comprises a first signal receiving buffer.

10. The nonlinear equalizer of claim 9, wherein each said linear equalizer comprises a second signal-receiving buffer.

11. A measurement while drilling telemetry system comprising:

a downhole pulse generating assembly; and a surface pulse receiving assembly, comprising, a transducer, generating a transducer signal in response to pulses received from said downhole pulse generating assembly, a nonlinear equalizer operatively coupled to receive said transducer signal, said nonlinear equalizer comprising, a first plurality of nonlinear function elements, each said nonlinear function element configured to generate a nonlinear output signal which is a nonlinear function of said transducer signal, a plurality of linear equalizers distributed and coupled such that each linear equalizer receives an input selected from the output of said nonlinear function output signals and said input signal, and generates an output signal in response thereto, an accumulator operatively coupled to receive the output signal of each said linear equalizer to generate a summed output signal in response thereto, and a coefficient adjustment unit operatively coupled to receive the said summed output signal, and to generate an adaptive signal operatively communicated to each said linear equalizer.

12. A nonlinear equalizer for reducing distortion in a measurement while drilling data signal, comprising:

a first individual linear equalizer coupled to receive said data signals;

a plurality of nonlinear function elements coupled to receive said data signal and to generate a nonlinear output signal;

a plurality of linear equalizers, each linear equalizer coupled to receive as an input, a selected nonlinear output signal, wherein said individual linear equalizer and said plurality of linear equalizers each comprises a finite impulse response filter operable in response to an input filter coefficient, each said linear equalizer operable to generate an output signal;

a summation unit coupled to receive each said output signal and to generate a summed output signal; and an error detection of assembly operable to generate an error signal in response to said summed output signal.

13. The nonlinear equalizer of claim 12, wherein said error detection assembly comprises, a slicer operatively coupled to receive said summed output signal, and to generate a slicer output signal;

a subtraction assembly operable to receive said summed output signal and said slicer output signal and to generate an error signal; and coefficient correction circuitry for determining an updated finite impulse response filter coefficient in response to said error signal for each said linear equalizer.

* * * * *